US010659178B2

(12) United States Patent
Martel et al.

(10) Patent No.: US 10,659,178 B2
(45) Date of Patent: May 19, 2020

(54) FRONTHAUL REMOTE ACCESS AND MONITORING SYSTEMS AND METHODS TO TEST FIBER OPTIC INFRASTRUCTURE AND RF SPECTRUM

(71) Applicant: EXFO Inc., Québec (CA)

(72) Inventors: Jean-Sébastien Martel, Québec (CA); Stéphane Perron, Québec (CA)

(73) Assignee: EXFO Inc., Québec (CA)

( * ) Notice: Subject to any disclaimer, the term of this patent is extended or adjusted under 35 U.S.C. 154(b) by 0 days.

(21) Appl. No.: 16/159,013

(22) Filed: Oct. 12, 2018

(65) Prior Publication Data

US 2019/0386753 A1   Dec. 19, 2019

Related U.S. Application Data

(60) Provisional application No. 62/686,466, filed on Jun. 18, 2018.

(51) Int. Cl.
| | |
|---|---|
| *H04B 17/15* | (2015.01) |
| *H04B 10/2575* | (2013.01) |
| *H04B 10/071* | (2013.01) |
| *H04B 17/29* | (2015.01) |
| *G01M 11/00* | (2006.01) |
| *G02B 6/35* | (2006.01) |
| *G02B 6/122* | (2006.01) |

(52) U.S. Cl.
CPC ......... *H04B 17/15* (2015.01); *G01M 11/3109* (2013.01); *G02B 6/122* (2013.01); *G02B 6/35* (2013.01); *H04B 10/071* (2013.01); *H04B 10/25753* (2013.01); *H04B 17/29* (2015.01)

(58) Field of Classification Search
CPC ........ H04B 17/15; H04B 17/29; H04B 7/022; H04B 10/00; H04B 10/071; H04B 10/077; H04B 10/25753; H04L 69/22; G01M 11/3109; H04W 24/08; H04W 88/085; G02B 6/26; G02B 6/35; G02B 6/122
USPC ........................................ 385/12, 16–22, 24
See application file for complete search history.

(56) References Cited

U.S. PATENT DOCUMENTS

| | | | |
|---|---|---|---|
| 8,482,725 B2 | 7/2013 | Perron et al. | |
| 8,576,389 B2 | 11/2013 | Perron et al. | |
| 8,687,957 B2 | 4/2014 | Perron | |
| 9,134,197 B2 | 9/2015 | L'Heureux et al. | |
| 9,641,243 B2 | 5/2017 | Perron | |
| 10,165,459 B2 * | 12/2018 | Jack ..................... | H04W 24/08 |

\* cited by examiner

*Primary Examiner* — Michael P Mooney
(74) *Attorney, Agent, or Firm* — Clements Bernard Walker; Lawrence A. Baratta, Jr.

(57) ABSTRACT

Fronthaul monitoring systems and methods include a Radio Frequency (RF) analysis module configured to receive an optical RF signal for RF testing thereof; a fiber monitoring module configured to perform fiber monitoring testing; an optical switch configured to switch a port connected to the RF analysis module and the fiber monitoring module between one or more Remote Radio Heads (RRH); and a test coordinator software module configured to coordinate the RF testing and the fiber monitoring testing. The optical RF signal is at different wavelengths than a fiber test signal for the fiber monitoring testing, such that the RF testing and the fiber monitoring testing can be performed concurrently.

20 Claims, 8 Drawing Sheets

FRONTHAUL REMOTE ACCESS AND MONITORING SYSTEMS AND METHODS TO TEST FIBER OPTIC INFRASTRUCTURE AND RF SPECTRUM

CROSS-REFERENCE TO RELATED APPLICATION(S)

The present patent/application claims priority to U.S. Provisional Patent Application Ser. No. 62/686,466, filed Jun. 18, 2018, and entitled "Fronthaul remote access and monitoring systems and methods to test fiber optic infrastructure and RF spectrum," the contents of which are incorporated herein by reference.

FIELD OF THE DISCLOSURE

The present disclosure generally relates to network testing systems and methods. More particularly, the present disclosure relates to fronthaul remote access and monitoring systems and methods which test both fiber optic infrastructure and Radio Frequency (RF) spectrum.

BACKGROUND OF THE DISCLOSURE

The evolution of fronthaul networks towards a Cloud Radio Access Network (C-RAN) architecture, the introduction of new wireless technology and new RF bands increase the number of Remote Radio Heads (RRH) being deployed. This increased number of RRHs necessitates remote testing approaches such as for RF analysis testing and Optical Time Domain Reflectometry (OTDR) testing. The conventional approach to RF analysis and OTDR testing utilizes separate devices, for testing at different times. Again, as the number of RRH deployments increases, this approach is inefficient and costly. Further, conventional test tools do not have the resolution or processing ability to determine real-world interference, resulting in undiagnosed, critical RF interference issues. Even further, the conventional approach of diagnosing the root cause of RF interference and Passive Intermodulation (PIM) issues utilizes a "trial and error" approach which is costly, leading to repeat truck rolls (visits to the site), causing reworks, having a long mean-time-to-repair, and having associated impact to subscriber quality of experience.

Accordingly, there is a need for fronthaul remote access and monitoring systems and methods which test both fiber optic infrastructure and RF spectrum, efficient and more accurately.

BRIEF SUMMARY OF THE DISCLOSURE

In an embodiment, a fronthaul monitoring system includes a Radio Frequency (RF) analysis module configured to receive an optical RF signal for RF testing thereof; a fiber monitoring module configured to perform fiber monitoring testing; an optical switch configured to switch a port connected to the RF analysis module and the fiber monitoring module between multiple Remote Radio Heads (RRH); and a test coordinator software module configured to coordinate the RF testing of the multiple RRHs and the fiber monitoring testing to the multiple RRHs. The test coordinator software module can perform coordination by causing a baseline fiber monitoring test to each RRH to locate all inline switches. Subsequent to the baseline fiber monitoring test, the test coordinator software module can perform coordination by causing RF testing and fiber monitoring testing with each of the multiple RRHs based on a schedule. Responsive to a higher priority test, the test coordinator software module can be configured to pause the schedule, cause the higher priority test, and resume the schedule subsequent to the higher priority test.

The optical switch can be a cascaded optical switch, and the schedule can be based on a map between ports of the cascaded optical switch, such that the test coordinator software module is configured to control switching of the cascaded optical switch through all ports for the schedule. The test coordinator software module can be configured to cause an RF test of a specific RRH and, subsequent to sampling RF frames, the test coordinator software module can be configured to cause a start of the fiber monitoring testing. The optical RF signal can be at a wavelength at or around 1310 nm or at or around 1550 nm and a fiber test signal for the fiber monitoring testing can be at or around 1650 nm. The fiber monitoring testing can be Optical Time Domain Reflectometry (OTDR) testing and the RF testing can be receiving and monitoring a Common Public Radio Interface (CPRI) link. The optical RF signal can be a Common Public Radio Interface (CPRI) link operating between 1.2 Gb/s to 12.1 Gb/s (CPRI options 2-9), and the fiber monitoring module can perform an Optical Time Domain Reflectometry (OTDR) test at a different wavelength than the CPRI link.

In another embodiment, a fronthaul monitoring method includes receiving an optical RF signal for RF testing thereof at a Radio Frequency (RF) analysis module; performing fiber monitoring testing via a fiber monitoring module; configuring an optical switch to switch a port connected to the RF analysis module and the fiber monitoring module between one or more Remote Radio Heads (RRH); and utilizing a test coordinator software module to coordinate the RF testing of the one or more RRHs and the fiber monitoring testing to the one or more RRHs. The test coordinator software module can perform coordination by causing a baseline fiber monitoring test to each RRH to locate all inline switches. Subsequent to the baseline fiber monitoring test, the test coordinator software module can perform coordination by causing RF testing and fiber monitoring testing with each of the multiple RRHs based on a schedule. Responsive to a higher priority test, the test coordinator software module can be configured to pause the schedule, cause the higher priority test, and resume the schedule subsequent to the higher priority test.

The optical switch can be a cascaded optical switch, and the schedule is based on a map between ports of the cascaded optical switch, such that the test coordinator software module can be configured to control switching of the cascaded optical switch through all ports for the schedule. The test coordinator software module can be configured to cause an RF test of a specific RRH and, subsequent to sampling RF frames, the test coordinator software module can be configured to cause a start of the fiber monitoring testing. The fiber monitoring testing can include Optical Time Domain Reflectometry (OTDR) testing and the RF testing can include receiving and monitoring a Common Public Radio Interface (CPRI) link.

In a further embodiment, a test coordinator system includes a processor; and memory storing instructions that, when executed, cause the processor to configure an optical switch to switch a port connected to the RF analysis module and the fiber monitoring module between one or more RRHs and the first RRH; coordinate reception an optical RF signal for RF testing thereof at a Radio Frequency (RF) analysis module and perform fiber monitoring testing via a fiber monitoring module on a specific fiber connected to a first Remote Radio Head (RRH); and periodically coordinate the RF testing of the one or more RRHs and the first RRH and the fiber monitoring testing to the one or more RRHs and the first RRH. The memory storing instructions that, when executed, can further cause the processor to cause a baseline fiber monitoring test to each RRH to locate all inline switches. Subsequent to the baseline fiber monitoring test, the memory storing instructions that, when executed, can further cause the processor to cause RF testing and fiber monitoring testing with each of the multiple RRHs based on a schedule. Responsive to a higher priority test, the memory storing instructions that, when executed, further cause the processor to pause the schedule, cause the higher priority test, and resume the schedule subsequent to the higher priority test.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to fronthaul remote access and monitoring systems and methods which test both fiber optic infrastructure and Radio Frequency (RF) spectrum remotely. The systems and methods provide leading resolution and accuracy to allow users to pinpoint and troubleshoot RF interference issues and fiber faults remotely, eliminating unnecessary on-site visits. The systems and methods combine a fiber monitoring capacity with the RF analysis capacity, providing a complete automated real-time monitoring system of links between Base Stations (BBU) and Remote Radio Heads (RRH). Integrating both the RF spectrum and optical fiber testing in a single monitoring system gives a cohesive assessment of the fronthaul network health status at the RF and fiber levels.

The two tests (optical fiber and RF) can be performed simultaneously, on the same link, on the same ports, with single connectivity to the network, via a fronthaul monitoring system. This simultaneous testing occurs at the same time without interfering with one another to do continuous monitoring. That is, the systems and methods advantageously carry out fiber monitoring testing (e.g., OTDR) on the same link as RF analysis testing. The fronthaul monitoring system can have single connectivity (same fibers) as well as one or more optical switches to enable the fronthaul monitoring system to monitor multiple RRHs and connectivity thereto. The fronthaul monitoring system can perform the two tests (fiber monitoring and RF analysis) continuously over time and by switching to different cascaded switch ports. To support testing coordination, the fronthaul monitoring system includes test scheduling and coordination functionality as described herein. Also, the systems and methods reduce the time to identify RF interference issues in the network by allowing operators to remotely look for RF interferes, i.e., no requirement to be on site. Further, interferes can be watched and it can be identified when they are eliminated.

Fronthaul Monitoring System

Figure 1:
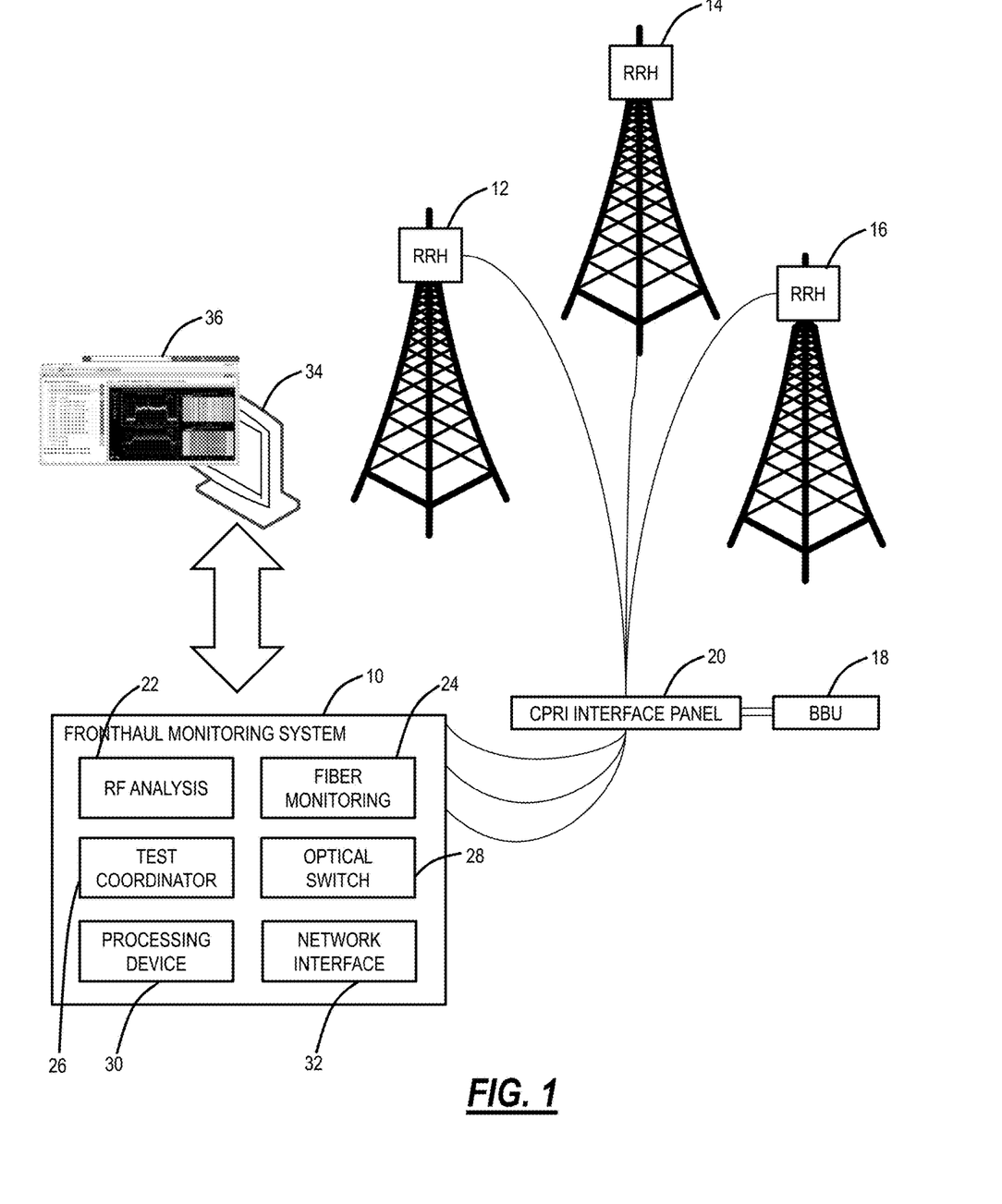
FIG. 1 is a network diagram of a fronthaul monitoring system and associated functionality with the fronthaul monitoring system connected to three example Remote Radio Heads (RRH)

FIG. 1 is a network diagram of a fronthaul monitoring system 10 and associated functionality with the fronthaul monitoring system 10 connected to three example RRHs 12, 14, 16. The RRHs 12, 14, 16 can be on cell towers, etc. and are configured to provide wireless service. The RRHs 12, 14, 16 can be connected to a Baseband Unit (BBU) 18 via optical fiber and there can be a Common Public Radio Interface (CPRI) interface panel 20 which provides optical fiber connectivity for the fronthaul monitoring system 10. The CPRI interface panel 20 is used to test optical fiber connectivity between the BBU 18 and the RRHs 12, 14, 16. The CPRI interface panel 20 can provide non-intrusive monitoring to the optical fibers, such as a splitter/combiner architecture which can allow the fronthaul monitoring system 10 to receive RF optical connectivity from the RRHs 12, 14, 16 for RF analysis testing and/or perform fiber monitoring testing up to the RRHs 12, 14, 16. That is, the CPRI interface panel 20 enables the fronthaul monitoring system 10 to "tap" a portion of the optical RF signal between a particular RRH 12, 14, 16 and the BBU 18 to perform RF analysis testing and to send an optical probe signal to the particular RRH 12, 14, 16 and receive a back-reflected signal to perform fiber monitoring testing (e.g., OTDR).

The functional components of the fronthaul monitoring system 10 include RF analysis 22, fiber monitoring 24, a test coordinator 26, an optical switch 28, a processing device 30, and a network interface 32. The RF analysis 22 is used to perform RF testing by monitoring the RF optical signal from a particular RRH 12, 14, 16. As described above, the RF optical signal is "tapped" from the CPRI interface panel 20 and provided to the RF analysis 22. The RF analysis 22 is used to identify RF interference and Passive Intermodulation (PIM) issues. The RF analysis 22 provides real-time and high resolution over the CPRI RF optical signal. In an embodiment, the RF analysis 22 can be realized via a pluggable module such as an optical Small Form Factor Pluggable (SFP). The RF analysis 22 can support the CPRI link rate of between 1.2 Gb/s to 12.1 Gb/s (CPRI options 2-9) as well as future or different link rates. The RF analysis 22 can support various different wavelengths such as 1310 nm, 1550 nm, etc.

The fiber monitoring 24 enables fiber testing namely OTDR from the fronthaul monitoring system 10 to the particular RRH 12, 14, 16. The fiber monitoring 24 operates by injecting a series of pulses into the optical fiber at the fronthaul monitoring system 10 and monitoring at the same point via the fronthaul monitoring system 10 the scattered or reflected signal from different points along the optical fiber to the particular RRH 12, 14, 16. The results of the testing by the fiber monitoring 24 are used to locate fiber-related issues. In an embodiment, the fiber monitoring 24 can operate at a different wavelength than the CPRI link for the RF analysis 22, enabling the RF analysis testing and the fiber monitoring testing to be performed concurrently by the fronthaul monitoring system 10. For example, the fiber monitoring 24 wavelength can be 1650 nm.

The test coordinator 26 is configured to manage the RF analysis testing via the RF analysis 22 and the fiber monitoring testing via the fiber monitoring 24, ensuring the two tests can be performed on the same port at the same time. Specifically, the test coordinator 26 ensures that one test does not affect the results of the other test. The test coordinator 26 can be a software module which is configured to control various aspects of the fronthaul monitoring system 10.

The optical switch 28 is configured to switch the optical port to different RRHs 12, 14, 16. Specifically, the RF analysis 22 and the fiber monitoring 24 can connect over the same fiber port out of the fronthaul monitoring system 10 in a duplex configuration. In the duplex configuration, the fronthaul monitoring system 10 supports both uplink and downlink, namely downlink to receive the CPRI RF signal from the BBU 18 for the RF analysis 22 and uplink to the RRH 12, 14, 16 and provide the OTDR test signal. The purpose of the optical switch 28 is to enable the fronthaul monitoring system 10 to monitor a plurality of RRHs 12, 14, 16 over time. The fronthaul monitoring system 10 can monitoring N RRHs where N is a number of ports in the optical switch. In various embodiments, N can be any number such as 12, 18, etc. even large numbers such as 256, 576, 720, etc.

The processing device 30 can include a processor, memory, and a data store. The processor is a hardware device for executing software instructions. The processor may be any custom made or commercially available processor, a central processing unit (CPU), an auxiliary processor among several processors associated with the processing device 30, a semiconductor-based microprocessor (in the form of a microchip or chip set), or generally any device for executing software instructions. When the fronthaul monitoring system 10 is in operation, the processing device 30 is configured to execute software stored within the memory, to communicate data to and from the memory, and to generally control operations of the fronthaul monitoring system 10 pursuant to the software instructions. The memory and the data store in the processing device 30 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. The software in the memory may include one or more software programs, each of which includes an ordered listing of executable instructions for implementing logical functions for operation of the fronthaul monitoring system 10.

The network interface 32 is used to enable the fronthaul monitoring system 10 to communicate over a network, such as the Internet, a wide area network (WAN), a local area network (LAN), and the like, etc. The network interface 32 may include, for example, an Ethernet card or adapter or a wireless local area network (WLAN) card or adapter. The network interface may include address, control, and/or data connections to enable appropriate communications on the network. The network interface 32 can connect to a user device 34 which can be a laptop computer, desktop computer, server, mobile device, tablet, smartphone, etc. The user device 34 can provide a User Interface (UI) 36 for interacting with the fronthaul monitoring system 10.

In an embodiment, the fronthaul monitoring system 10 includes the Radio Frequency (RF) analysis 22 module configured to receive an optical RF signal for RF testing thereof; the fiber monitoring 24 module configured to perform fiber monitoring testing; the optical switch 28 configured to switch a port connected to the RF analysis 22 module and the fiber monitoring 24 module between one or more Remote Radio Heads (RRH) 12, 14, 16; and the test coordinator 26 module configured to coordinate the RF testing and the fiber monitoring testing.

The optical RF signal is at different wavelengths than a fiber test signal for the fiber monitoring testing, such that the RF testing and the fiber monitoring testing can be performed concurrently. The optical RF signal can be at a wavelength at or around 1310 nm or at or around 1550 nm and a fiber test signal for the fiber monitoring testing can be at or around 1650 nm. The fiber monitoring testing can include Optical Time Domain Reflectometry (OTDR) testing and the RF testing can include receiving and monitoring a Common Public Radio Interface (CPRI) link.

The optical switch can have N ports connected to N RRHs, N being an integer greater than 1, and wherein the test coordinator 26 module is configured to schedule, control, and operate the RF analysis module, the fiber monitoring module, and the optical switch to perform the RF testing and the fiber monitoring testing over the N ports. The test coordinator 26 module is configured to coordinate a standard schedule which performs testing on each of the N ports over time, and the test coordinator software module is further configured to test a specific port of the N ports based on an external request including a triggered event. The optical RF signal can be a Common Public Radio Interface (CPRI) link operating between 1.2 Gb/s to 12.1 Gb/s (CPRI options 2-9), and the fiber monitoring module can perform an Optical Time Domain Reflectometry (OTDR) test at a different wavelength than the CPRI link.

Figure 2:
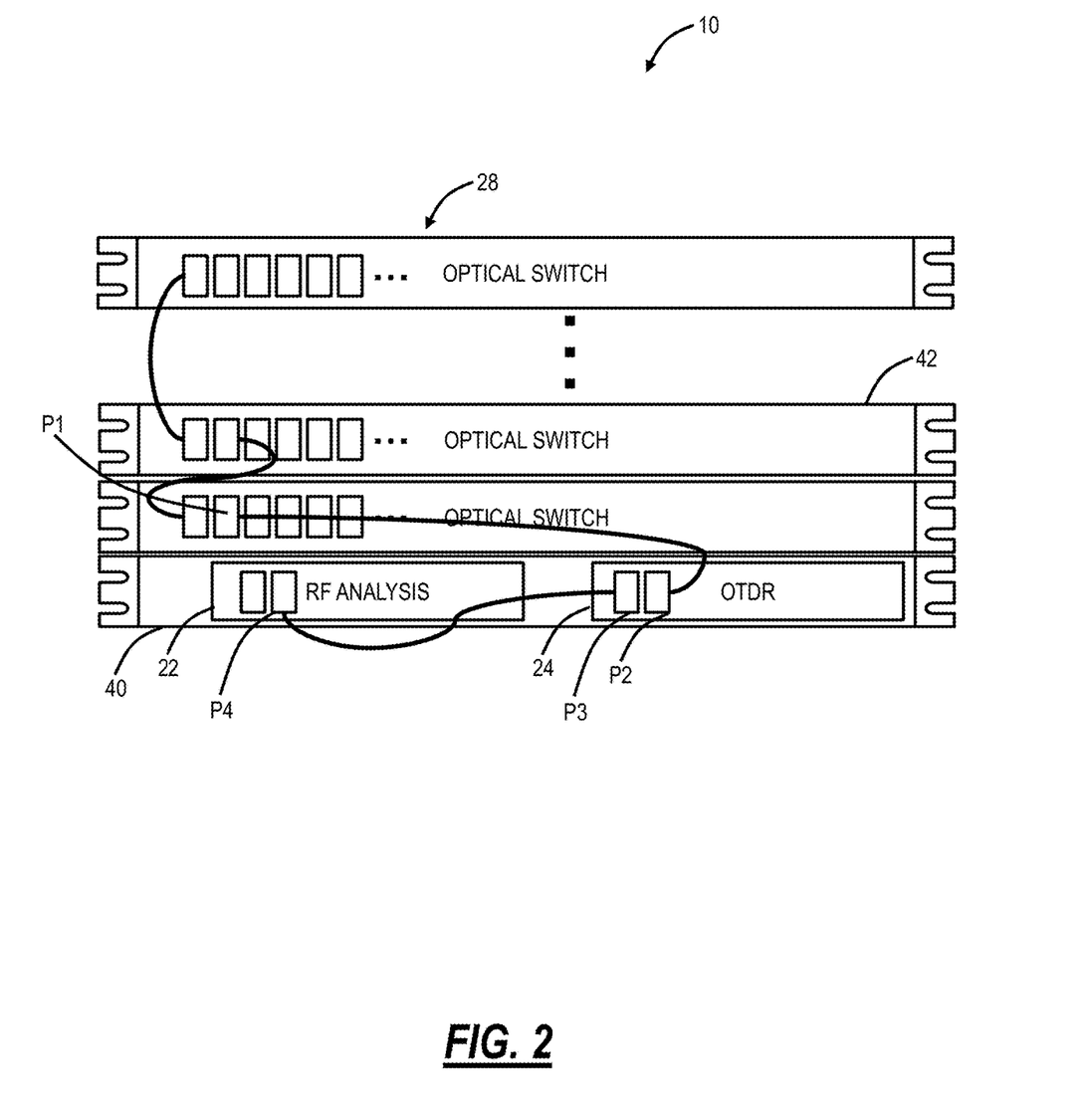
FIG. 2 is a front diagram of the fronthaul monitoring system implemented as rack mounted equipment.

FIG. 2 is a front diagram of the fronthaul monitoring system 10 implemented as rack mounted equipment. The rack mounted equipment provides one example implementation of the fronthaul monitoring system 10 which is functionally described in FIG. 1. Here, the fronthaul monitoring system 10 includes a rack 40 which includes two modules for the RF analysis 22 and the fiber monitoring 24. The rack 40 can be a 1 Rack Unit (RU) sized device, and it can also include the test coordinator 26, the processing device 30, and the network interface 32. The optical switch 28 can be a cascaded optical switch which is formed by multiple devices 42 which can be rack-mounted devices.

The fronthaul monitoring system 10 can address different sizes based on the configuration of the optical switch 28 and the associated devices 42. For example, the fronthaul monitoring system 10 can address large C-RAN hub site topologies with on-demand and monitoring test features for the RF spectrum (RF analysis 22) and the fiber network (fiber monitoring 24). That is, the fronthaul monitoring system 10 can monitor hundreds of links at the RF and fiber level. The fronthaul monitoring system 10 can also upgrade as the C-RAN hub site grows to allow for port count monitoring expansion by stacking the external optical switches 28 to increase the number of links to be monitored.

The configuration of the fronthaul monitoring system 10 is based on port count and testing availability. Of course, the fronthaul monitoring system 10 could monitor thousands of links, but this would spread the fronthaul monitoring system 10 thin such that each link is only monitored for a short time at longer intervals. Further, the fact that the RF analysis testing and the fiber monitoring testing is performed concurrently significantly improves the testing time.

FIG. 2 includes an example cabling scenario where the optical switch 28 is cascaded with multiple devices. The optical switch 28 is optically connected to the RRHs 12, 14, 16, including many more RRHs, and is configured to switch the optical connection from a particular RRH 12, 14, 16 to the fronthaul monitoring system 10. The optical switch 28 provides connectivity between a single fronthaul monitoring system 10 and multiple RRHs 12, 14, 16.

In an embodiment, an output port P1 of the optical switch 28 is connected to an input port P2 of the OTDR (the fiber monitoring 24 module). Again, the RF testing can be at about 1550 nm and the OTDR testing can be about 1650 nm. The fiber monitoring 24 module can include a filter which filters out 1550 nm (or some other portion of the spectrum) which can be output via output port P3 to an input port P4 on the RF analysis 22 module. Any interference between an OTDR wavelength and the RF signal is prevented through the filter which prevents any OTDR wavelengths from being visible on the RF analysis 22 module.

To support simultaneous testing, a baseline fiber monitoring 24 test is performed without simultaneous RF testing, i.e., a first test is an OTDR measurement alone. This is performed to identify any optical events pertaining to optical switch ports and the filters at the fiber monitoring 24 module. Specifically, the baseline test is performed to locate accurately all inline switches (in the OTDR result).

Figure 3:
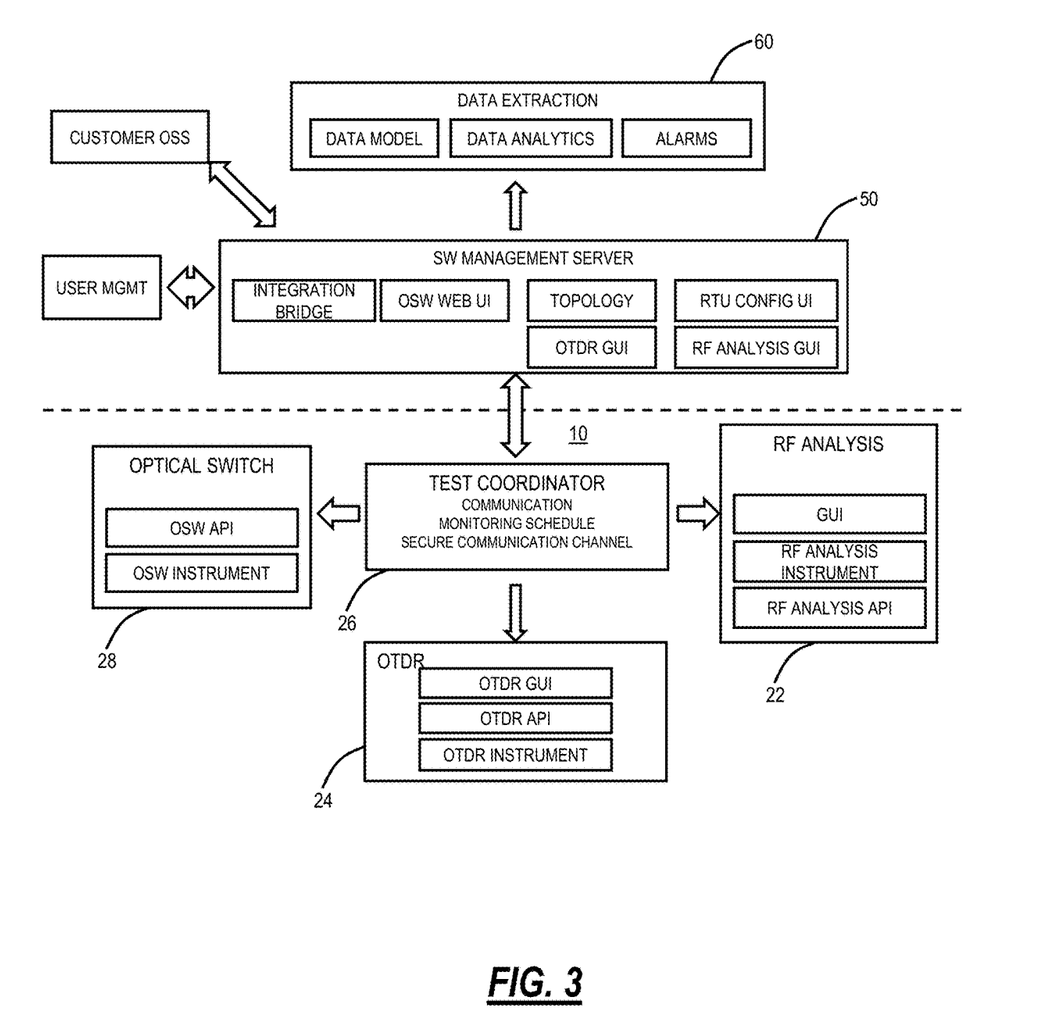
FIG. 3 is a block diagram of a software functionality of the fronthaul monitoring system and a corresponding software management server.

FIG. 3 is a block diagram of a software functionality of the fronthaul monitoring system 10 and a corresponding software management server 50. Again, the test coordinator 26 is configured to control the RF analysis 22, the fiber monitoring 24, and the optical switch 28. The test coordinator 26 can include communication functionality between the RF analysis 22, the fiber monitoring 24, and the optical switch 28, a scheduler, and a secure communication channel with the management server 50. The management server 50 can be a cloud-based system and the secure communication can be for testing data results, for configuration, etc. Each of the RF analysis 22, the fiber monitoring 24, and the optical switch 28 can include Application Programming Interfaces (APIs) for interfacing with underlying instrumentations (which physically performs associated functions). The RF analysis 22 and the fiber monitoring 24 can also include a Graphical User Interface (GUI) for displaying results and the like.

The management server 50 can support remote communication between the user device 34 and the fronthaul monitoring system 10. The management server 50 can include various functions such as an integration bridge, a Web UI for the Optical Switch (OSW), a topology component to track the topology of the fronthaul monitoring system 10 and the associated RRHs 12, 14, 16, a Remote Test Unit (RTU) configuration UI, and GUIs for the fiber monitoring 24 and the RF analysis 22. The management server 50 can also connect to customer Operations Support Systems (OSSs) as well as data extraction systems 60 for data modeling, data analytics, alarms, etc.

Simultaneous RF and Optical Testing

Again, the test coordinator 26 is configured to control operations of both the RF analysis 22 and the fiber monitoring 24 on the respective RRH including simultaneous RF and optical testing. This simultaneous testing is enabled based on the use of different wavelengths, fiber port interconnectivity, a baseline OTDR test, and integrated hardware, i.e., the fronthaul monitoring system 10. Again, the different wavelengths are described in detail herein. These different wavelengths are filtered at the fronthaul monitoring system 10 such that the RF testing and OTDR testing do not interfere with one another. The fiber port interconnectivity is described herein and includes the connections from the RRHs 12, 14, 16 to the optical switch 28 and from the optical switch 28 to the fronthaul monitoring system 10.

Test Coordinator

Figure 4:
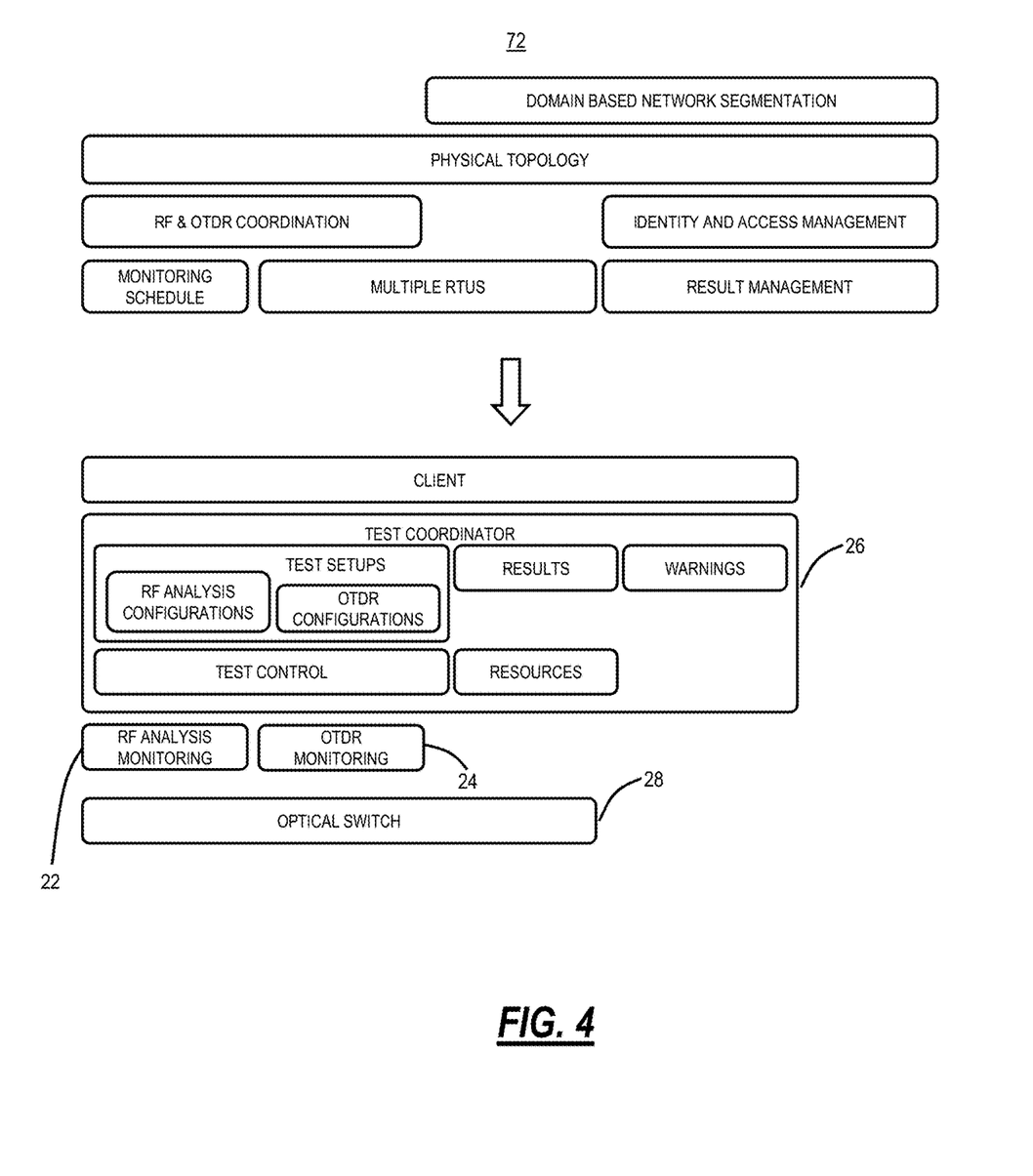
FIG. 4 is a block diagram of the building blocks of the test coordinator.

FIG. 4 is a block diagram of the building blocks of the test coordinator 26. Again, the test coordinator 26 is a software module that coordinates the operations of the fronthaul monitoring system 10 connected to a respective RRH of a plurality of RRHs through the optical switch 28. The test coordinator 26 further coordinates the operations of both the RF analysis 22 and the fiber monitoring 24 on the respective RRH. The test coordinator 26 can provide the autonomous use and assignment of shared RTU resources and exchanges control between interactive and automated testing. As described herein, the fronthaul monitoring system 10 is a shared RTU which is shared across the RRHs 12, 14, 16. The test coordinator 26 can operate independently, with no user interaction, and can be configured through the management server 50.

Specifically, the test coordinator 26 provides an internal test scheduler per RF analysis 22 module and the fiber monitoring 24 module. Control of the RF analysis 22 module and the fiber monitoring 24 module can be independent, the test coordinator 26 acts as an orchestrator processing events and controlling actions.

Inputs to the test coordinator 26 can include the physical network topology as well as network segmentation based on domains, RF and OTDR coordination, scheduling, managing multiple RTUs (fronthaul monitoring systems 10), results management, and identity and access management. The inputs can be communicated via the management server 50 which interfaces to a client connected to the test coordinator 26.

The test coordinator 26 includes test setups which are configurations of the RF analysis 22 and the fiber monitoring 24, results, warnings, test control, and resources. Again, the test coordinator 26 connects and controls the RF analysis 22 and the fiber monitoring 24 as well as the optical switch 28 into which the RF analysis 22 and the fiber monitoring 24 connect.

Figure 5:
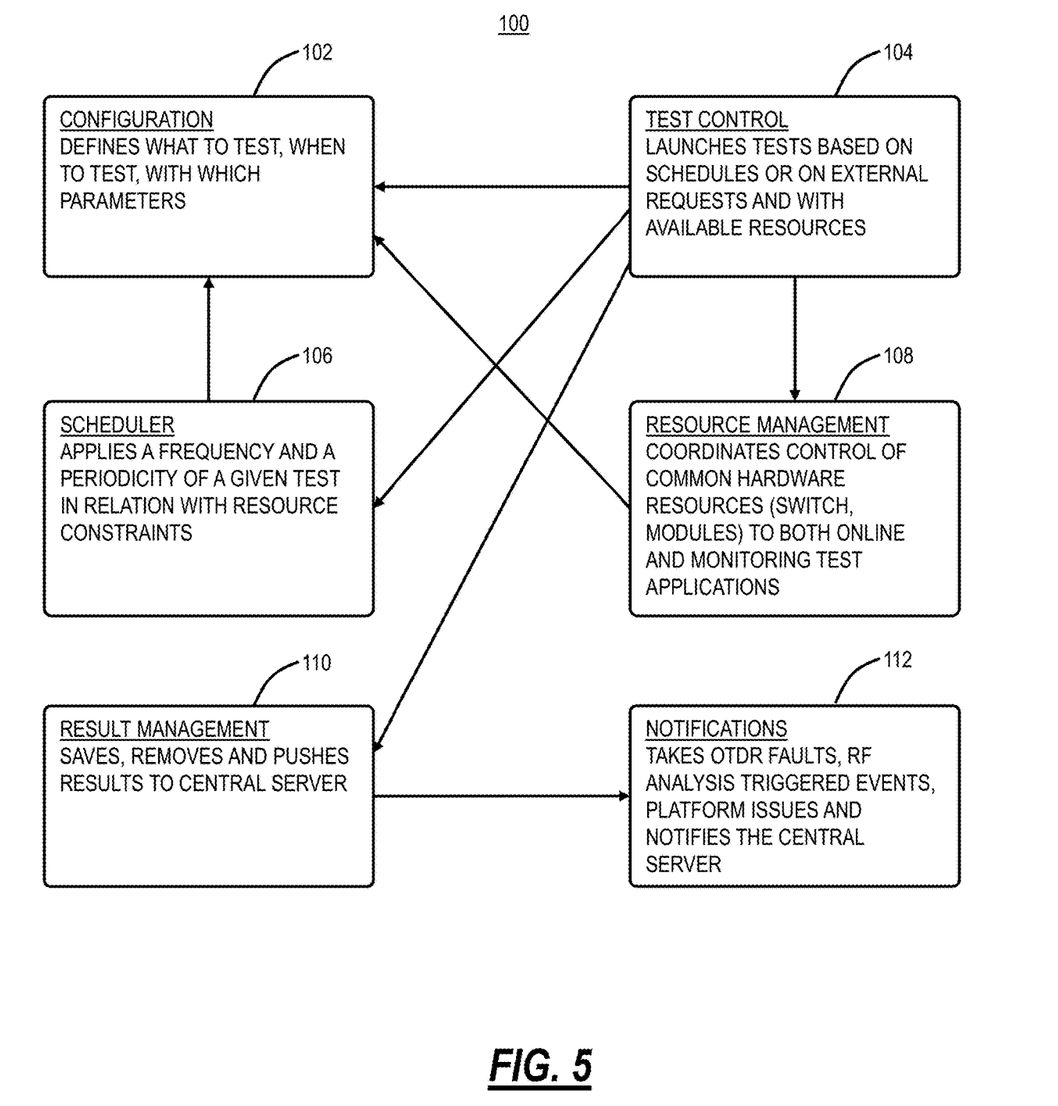
FIG. 5 is a block diagram of the features of the test coordinator.

FIG. 5 is a block diagram of features 100 of the test coordinator 26. The features 100 of the test coordinator 26 includes configuration 102, test control 104, a scheduler 106, resource management 108, result management 110, and notifications 112. The configuration 102 defines what to test, when to test, and which parameters to test. The test control 104 can launch specific tests based on schedules or based on external requests, with available resources. The scheduler 106 applies a frequency and periodicity of a given test in relation with resource constraints. Again, there can be N ports connected to the optical switch 28, and the scheduler 106 can define what tests are performed when on each of the N ports.

The resource management 108 coordinates control of common hardware resources, e.g., the optical switch 28, to both online and monitoring test applications. The results management 110 save, removes, and pushes results to a central server, e.g., the management server 50. The notifications 112 can take OTDR faults, RF analysis triggered event, platform issues, etc. and provide notification to the central server.

Figure 6:
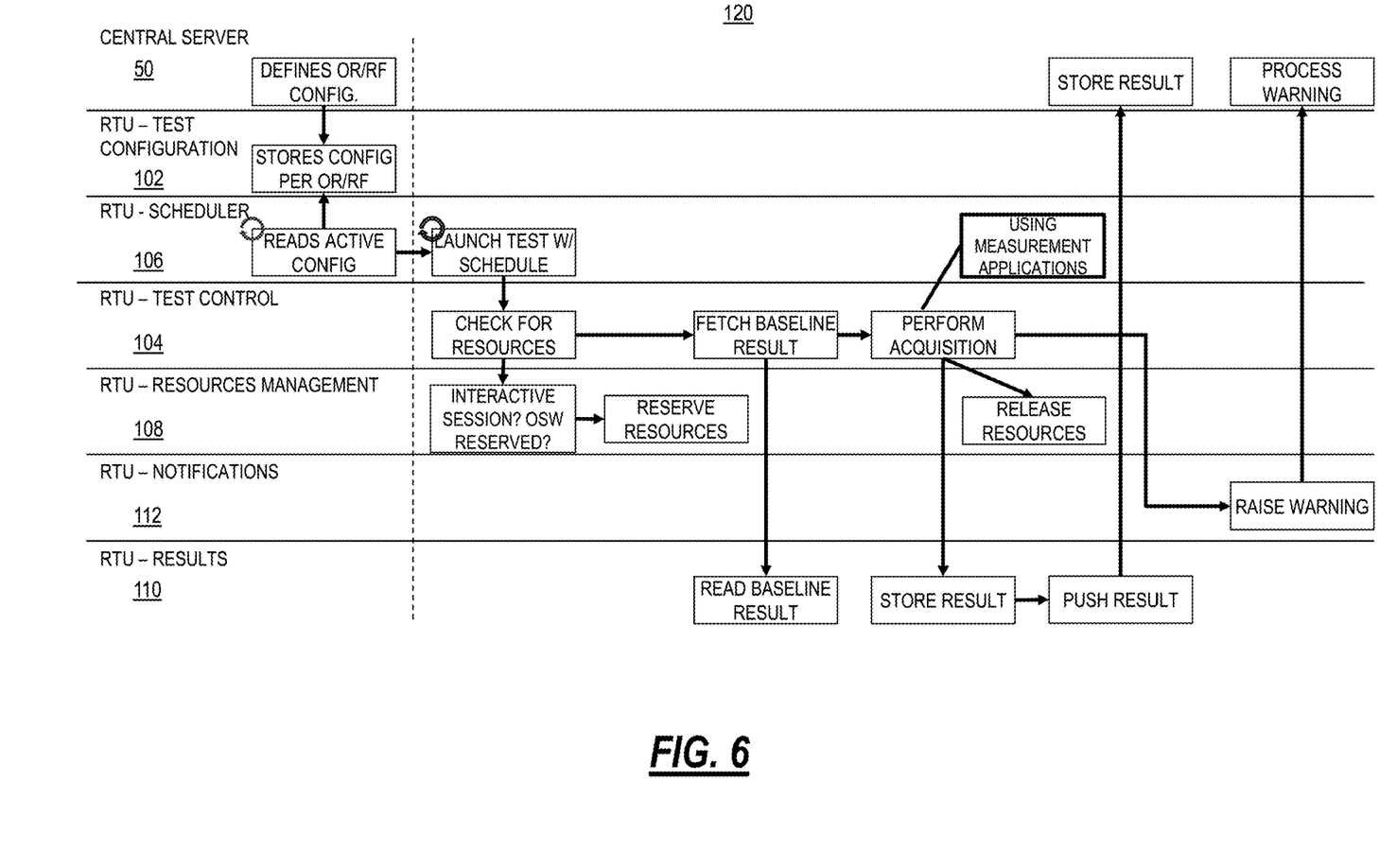
FIG. 6 is a flow diagram of a monitoring process utilizing the fronthaul monitoring system via the test coordinator.

FIG. 6 is a flow diagram of a monitoring process 120 utilizing the fronthaul monitoring system 10 via the test coordinator 26. The test coordinator 26 can cause monitoring tests in the fronthaul monitoring system 10 using both the RF analysis 22 and the fiber monitoring 24 modules when an optical route and an RF link share the same optical switch cascade. The test coordinator 26 can allow each of the tests to be performed in parallel to finish before switching the port used by both test modules via the optical switch 28. The test coordinator 26 can allow a single port of RF analysis 22 module to be in synchronized monitoring testing with the fiber monitoring 24 while another RF analysis 22 port is assigned to another optical switch 28 cascade for distinct tests.

The test coordinator 26 is a command and control system interfacing specialized testing instruments in the fronthaul monitoring system 10 for assigning shared resources. The test coordinator 26 can be commanded by a central system such as the management server 50 through a passive command queue mechanism. Commands can define test coordinator 26 material resources used such as optical switches (the optical switch 28), optical physical layer acquisition module (e.g., the fiber monitoring 24), protocol layer acquisition module (e.g., the RF analysis 22), and general computing and networking resources (e.g., the processing device 30).

The fiber monitoring 24 can share the optical switch 28 with the RF analysis 22 only for monitoring tests (baseline). The longest tests drive the delay between each tested port, and there can be a single schedule on the fronthaul monitoring system 10 for both modules (the RF analysis 22 and the fiber monitoring 24).

In the monitoring process 120, the test coordinator 26 program structure is broken down into six sub-systems 102-112. To start, the management server 50 can define configurations as described herein. A test configuration sub-system 102 contains Fiber Under Test (FUT) specification and its related test specification. A scheduler sub-system 106 defines schedules according to present test configurations and material availability convergence or divergence. A test control sub-system 104 orchestrates test execution with interfaced acquisition modules through test configuration reference and resources management. A resource management sub-system 110 manages constraints of both hardware and software availability including monitoring and accesses from a user. A notifications sub-system processes 112 results and system sensors for the management server 50 alarming module. A result management sub-system 110 processes results through the network for the management server 50 to process and on computer storage hardware for reference.

The scheduling is per configured FUT through the configuration of the optical switches 28. The configured FUT has a specified demarcation point type inserted between testing interconnection and service network interconnection. The fiber monitoring 24 can apply signal processing analysis based on the demarcation point type and by fiber length ranges required to identify optical events.

All automated tests are referenced in a configuration envelope shared with the management server 50 with OTDR tests for optical routes and ORF tests for RF links. The envelope's common purpose includes hardware assignment to Module, Optical switch ports, and ID sharing with the central system and OSS (Operational Support System). There can be multiple test settings such as a single Optical Route/RF Link for test escalation providing a future-ready design.

Optical Routes and RF Links can be defined and set through an Application Programming Interface (API). The test configuration can be unique per hardware chain (module, cascaded switch ports+port, Remote Radio Head (RRH)). The test configuration can contain characteristics either relevant for an OTDR (e.g., fiber code, helix factor, etc.) or ORF (antenna manufacturer, central band, etc.). The test configuration can be referenced through the API using an ID and key.

The test setups can contain test configuration parameters specific to the test performed, such as fault thresholds and analysis settings that will be passed to the test application. The test programs can include a test schedule for test setup and optical route/RF link pair.

The test coordinator 26 can include a queue like scheduler for a per module schedule. The queue schedule can include continuous monitoring: Round-robin overall test setups present in the schedule. The test order can be based on sequential switch ports. The queue like scheduler can keep track of the last performed test to resume scheduling on the next test, for reboot, interruptions. The per module scheduler includes test control to determine if the schedule can be performed in parallel with the optical switch 28 sharing or distinct paths.

The test coordinator 26 can perform priority based scheduling as follows (lower number is higher priority):

| | |
|---|---|
| 1 | Interactive RF test |
| 2 | Ad hoc OTDR test |
| 3 | Baseline OTDR test |
| 4 | On demand RF test |
| 5 | On demand OTDR test |
| 6 | Scheduled monitoring RF test |
| 7 | Scheduled monitoring OTDR test |

Simultaneous RF and OTDR testing is performed for the scheduled monitoring RF and OTDR test (tests #6 and 7).

For resource management, shared optical switches 28 can include a switch cascade path configured in each RF link and Optical Routes. This maintains an active status over which application has control over each optical switch 28, and OTDR monitoring does not require OSW control.

In an embodiment, the test coordinator 26 can implement a closest port first approach for the scheduled monitoring RF and OTDR test. This approach can minimize port switching delay, maintain optical switch instrument in-memory state longer for robustness, reduces wear in the optical switch 28, etc. Also, the scheduled monitoring RF and OTDR tests can be performed round robin—once all ports have been visited, the test coordinator 26 can start over from the first port. For example, assume the optical switch 28 is includes two devices OS-A, OS-B with 26 ports each in a cascade, i.e., optical switch device OS-B is connected through device OS-A port 1. Assume the current test is on OS-A port 1-OS-B port 25, then the next test will be on OS-A port 1-OS-B port 26. The subsequent will be on OS-A port 2 (OS-B is not involved because not connected to port 2 or OS-A). Other tests will be on OS-A port 3 up to port 26.

For timing of the RF testing, the RF sampling duration is controlled through configuration, such as based on the number of A×C found in CPRI frames. The OTDR testing is based on the fiber length and the number of optical events to characterize. In general, an OTDR test is longer than an RF test.

Preliminary Functionality to Establish the Order and Port Sequencing:

Test setups should be defined for continuous performance using available resources so that the fronthaul monitoring system 10 hardware is used as much as possible to detect issues on the network.

There can be a test schedule per hardware measurement module port (e.g., a hardware measurement module can include two ports), such as a round-robin schedule when the fronthaul monitoring system 10 is not requested to perform reference, Test on Demand (TOD), Ad hoc or interactive session tests. The test priority can be (high to low): Interactive session, ad hoc, TOD, continuous monitoring. The test coordinator 26 can automatically initiate monitoring tests in the absence of the following test requests and operations using the same modules: Test on Demand & Baseline, Ad Hoc, Interactive session, etc.

The test coordinator 26 can order monitoring tests based on optical route and RF link test module and optical switch cascade ports. For example, graph traversal: from the trunk to the first leaf. Starting from the first OSW port encountered.

The test coordinator 26 can allow each test port on the fronthaul monitoring system 10 to perform tests in parallel with each its own schedule only when no optical switch 28 cascade is shared.

The test coordinator 26 can perform monitoring tests on the optical route and RF links only when their respective test setups are identified as being part of the monitoring. The test coordinator 26 can exclude a given optical switch port when absent from any optical route or RF link optical switch cascade.

Switch Sharing Functionality for Fiber and RF Testing:

The fronthaul monitoring system 10 can support optical switch sharing between both test types (RF analysis 22, fiber monitoring 24) so the fronthaul monitoring system 10 performs both tests at the same time.

The fiber monitoring 24 can share an optical switch 28 with the RF analysis 22 only for monitoring tests after baseline OTDR is acquired. The longest tests drive the delay between each tested port, and there can be a single schedule on fronthaul monitoring system 10 for both modules.

The fiber monitoring 24 can perform monitoring tests using both the RF analysis 22 and fiber monitoring 24 modules when an optical route and an RF link share the same optical switch cascade. The test coordinator 26 can allow each of the tests performed in parallel to finish before switching port used by both test modules.

The test coordinator 26 can allow a single port of the RF analysis 22 module to be in synchronized monitoring testing with the fiber monitoring 24 while the other RF analysis 22 module port is assigned to another optical switch cascade to perform distinct tests.

Test Coordinator Process

Figure 7:
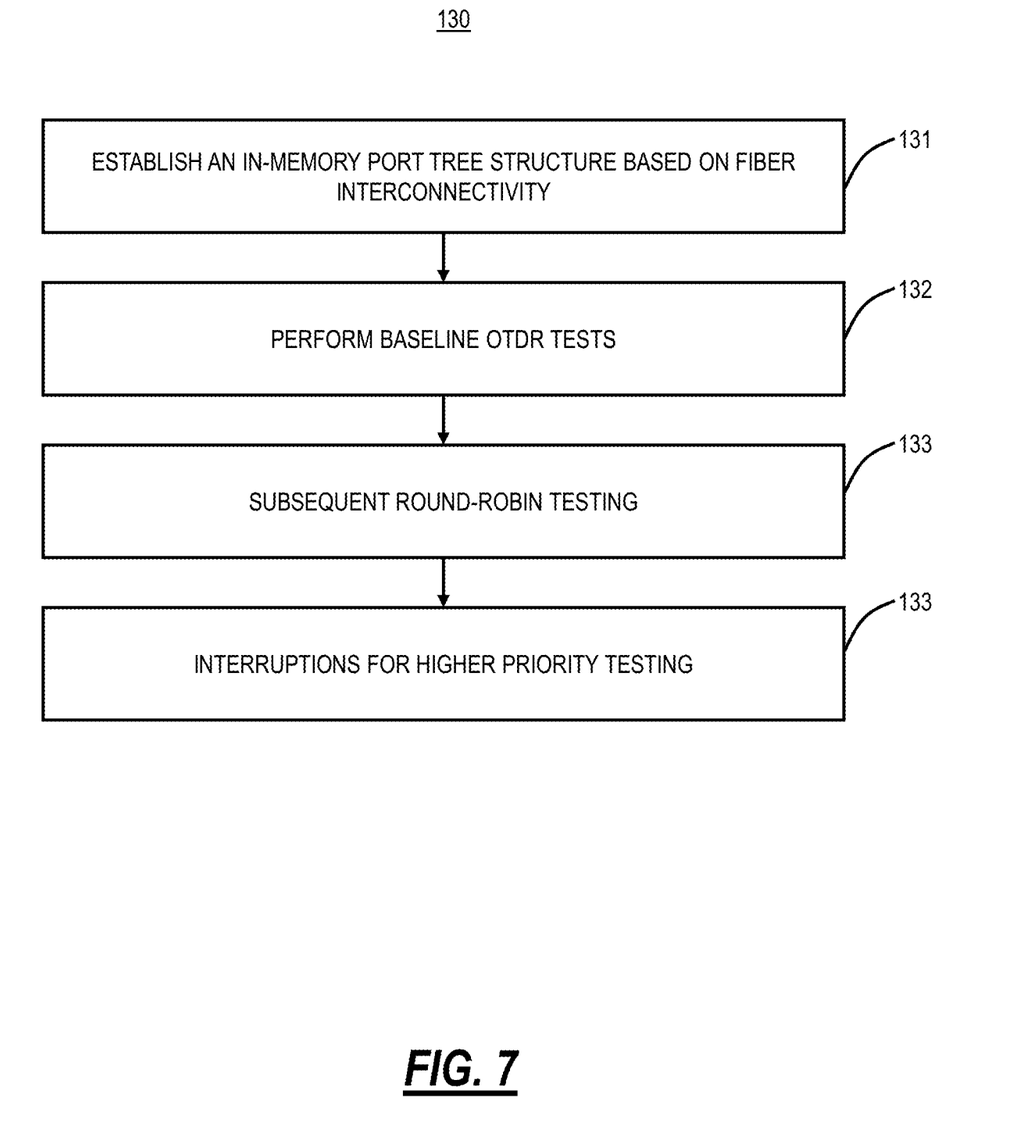
FIG. 7 is a flowchart of a test coordinator process.

FIG. 7 is a flowchart of a test coordinator process 130. The test coordinator process 130 is implemented by the test coordinator 26 to control the fiber monitoring 24 module and the RF analysis 22 module. The test coordinator process 130 includes establishment of an in-memory port tree structure based on fiber interconnectivity (step 131). The test coordinator 26 maps each involved optical switch to open up to the final output port which connects to the fronthaul monitoring system 10.

A first pass performs baseline OTDR tests that validates fiber interconnectivity accuracy (step 132). The test coordinator 26 can share optical switch control with the fiber monitoring 24 module. When fiber interconnectivity is inaccurate for a specific port, no OTDR test will be performed during scheduled monitoring OTDR testing on that port. RF testing is not impacted because of manual and interactive validation by end user. The completed baseline OTDR test is managed by the test coordinator 26. Also, each fiber interconnectivity change will trigger a baseline OTDR test on a specific port.

After the first pass, the test coordinator process 130 includes subsequent round-robin testing (step 133). The test coordinator 26 selects ports from optical switches involved in the selected optical route. The scheduled RF test is performed first. When the RF analysis 22 module is ready to sample CPRI frames, the test coordinator 26 receives an event that causes the start of an OTDR test by the fiber monitoring 24 module. The test coordinator 26 processes test results as soon as a test completes to maximize resources usage. Once both tests are completed, the test coordinator 26 proceeds to next optical route.

The test coordinator 26 allows for interruptions for higher priority testing during an ongoing simultaneous scheduled monitoring testing (e.g., the tests #1-5). These tests will interrupt the round robin scheduled tests. The test coordinator 26 can resets internal schedulers to resume schedule on the last performed test in the schedule after the interruption.

Also, the test coordinator 26 can manage hardware unavailability during the ongoing simultaneous scheduled monitoring testing. The hardware unavailability can include disconnected hardware including optical switches, RF or OTDR modules 22, 24. The test coordinator 26 can managed skipped optical routes by rescheduling those into each internal scheduler. For example, a rescheduled optical route can be only performed once per round-robin per internal scheduler. The test coordinator 26 can support hardware maintenance and fiber reconnection without stopping the testing unit.

Example Test Setup

Figure 8:
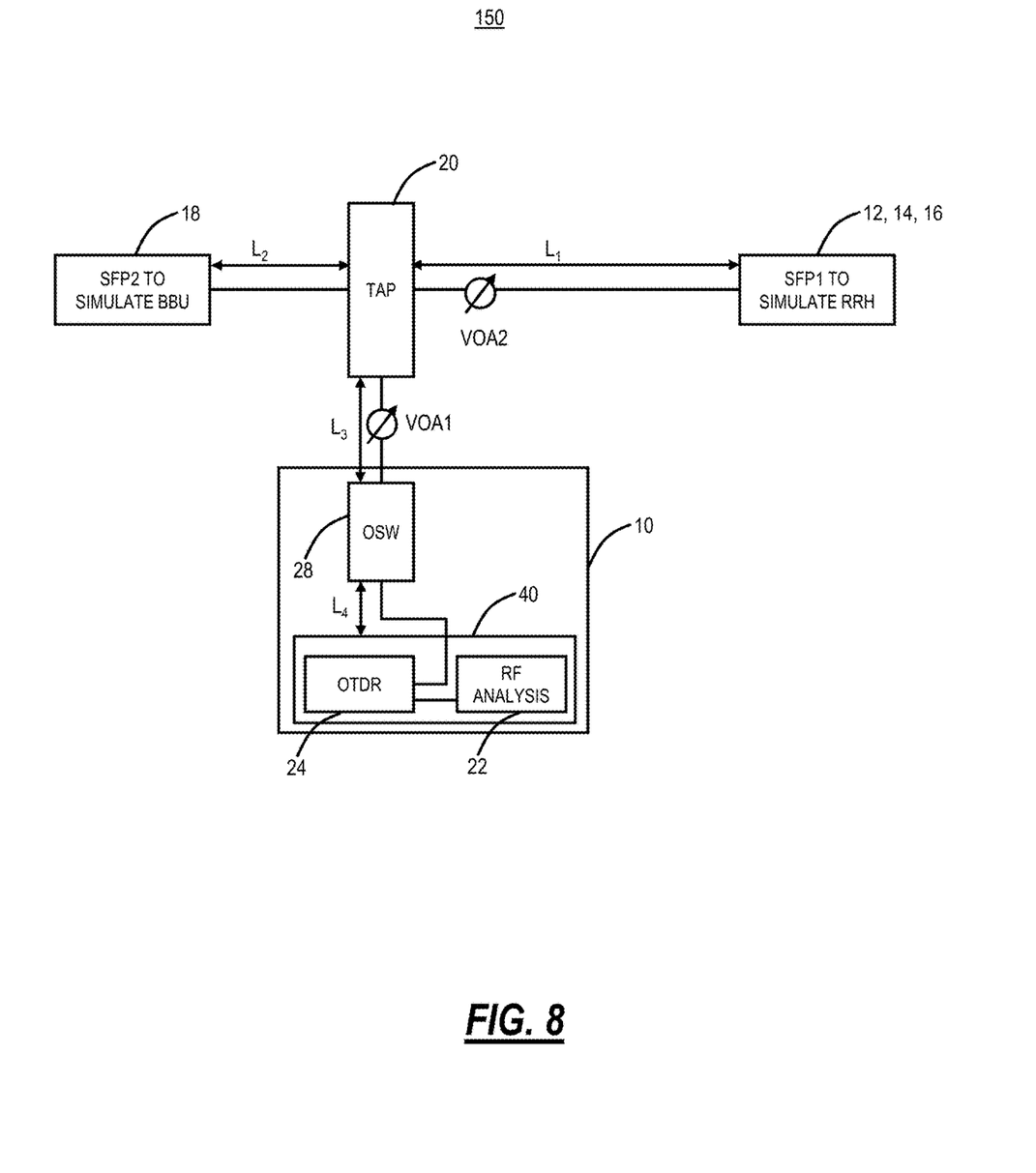
FIG. 8 is a diagram of an example C-RAN grey system for minimal link length testing.

FIG. 8 is a diagram of an example C-RAN grey system 150 for minimal link length testing. In this example, an SFP module is used to simulate each of the RRH 12, 14, 16 and the BBU 18. The CPRI interface panel 20 is formed by a tap. There is the fronthaul monitoring system 10 with the RF analysis 22 module connected to the fiber monitoring 24 module which connects to a port of the optical switch 28.

With respect to the length limitations of the 'C-RAN Grey' links that are monitored and troubleshoot with the fronthaul monitoring system 10 (with an integrated OTDR), two elements determine the length limitations for the monitored C-RAN:

1. The maximum distance (associated fiber loss) that can be monitored is limited by the sensitivity of the SP used for monitoring the data and the monitoring configuration (TAP ratio and a number of switch OUT ports).

2. The minimum distance is determined by the minimum length of fiber required by any OTDR to exit the recovery region and perform measurements after strongly reflective loss event which results.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A fronthaul monitoring system for monitoring a plurality of links between a base station and multiple Remote Radio Heads (RRH) comprising:
a Radio Frequency (RF) analysis module configured to receive an optical RF signal for RF testing of RF spectrum thereof to identify RF spectrum issues;
a fiber monitoring module configured to perform fiber monitoring testing by injecting light pulses on the one of the plurality of links to identify fiber infrastructure issues;
an input port connected to both the RF analysis module and the fiber monitoring module;
an optical switch configured to switch the input port between output ports connected to the multiple RRHs via the plurality of links; and
a test coordinator software module configured to coordinate the simultaneous RF testing of a link to one of the multiple RRHs and the fiber monitoring testing of the link, and to coordinate testing to the multiple RRHs via configuration of the optical switch.

2. The fronthaul monitoring system of claim 1, wherein the test coordinator software module performs coordination by causing a baseline fiber monitoring test to each RRH to locate all inline switches.

3. The fronthaul monitoring system of claim 1, wherein, subsequent to the baseline fiber monitoring test, the test coordinator software module performs coordination by causing RF testing and fiber monitoring testing with each of the multiple RRHs based on a schedule.

4. The fronthaul monitoring system of claim 3, wherein, responsive to a higher priority test, the test coordinator software module is configured to pause the schedule, cause the higher priority test, and resume the schedule subsequent to the higher priority test.

5. The fronthaul monitoring system of claim 3, wherein the optical switch is a cascaded optical switch, and the schedule is based on a map between ports of the cascaded optical switch, such that the test coordinator software module is configured to control switching of the cascaded optical switch through all ports for the schedule.

6. The fronthaul monitoring system of claim 1, wherein, the test coordinator software module is configured to cause an RF test of a specific RRH and, subsequent to sampling RF frames, the test coordinator software module is configured to cause a start of the fiber monitoring testing.

7. The fronthaul monitoring system of claim 1, wherein the optical RF signal is at a wavelength at or around 1310 nm or at or around 1550 nm and a fiber test signal for the fiber monitoring testing is at or around 1650 nm.

8. The fronthaul monitoring system of claim 1, wherein the fiber monitoring testing comprises Optical Time Domain Reflectometry (OTDR) testing and the RF testing comprises receiving and monitoring a Common Public Radio Interface (CPRI) link.

9. The fronthaul monitoring system of claim 1, wherein the optical RF signal is a Common Public Radio Interface (CPRI) link operating between 1.2 Gb/s to 12.1 Gb/s (CPRI options 2-9), and the fiber monitoring module performs an Optical Time Domain Reflectometry (OTDR) test at a different wavelength than the CPRI link.

10. A fronthaul monitoring method for monitoring a plurality of links between a base station and multiple Remote Radio Heads (RRH) comprising:
receiving an optical RF signal for RF testing of RF spectrum thereof to identify RF spectrum issues at a Radio Frequency (RF) analysis module;
performing fiber monitoring testing via a fiber monitoring module by injecting light pulses on the one of the plurality of links to identify fiber infrastructure issues;
configuring an optical switch to switch an input port connected to the RF analysis module and the fiber monitoring module between one or more Remote Radio Heads (RRH); and
utilizing a test coordinator software module to coordinate the simultaneous RF testing of a link to one of the one or more RRHs and the fiber monitoring testing of the link, and to coordinate testing to the one or more RRHs via the configuring of the optical switch.

11. The fronthaul monitoring method of claim 10, wherein the test coordinator software module performs coordination by causing a baseline fiber monitoring test to each RRH to locate all inline switches.

12. The fronthaul monitoring method of claim 10, wherein, subsequent to the baseline fiber monitoring test, the test coordinator software module performs coordination by causing RF testing and fiber monitoring testing with each of the multiple RRHs based on a schedule.

13. The fronthaul monitoring method of claim 12, wherein, responsive to a higher priority test, the test coordinator software module is configured to pause the schedule, cause the higher priority test, and resume the schedule subsequent to the higher priority test.

14. The fronthaul monitoring method of claim 12, wherein the optical switch is a cascaded optical switch, and the schedule is based on a map between ports of the cascaded optical switch, such that the test coordinator software module is configured to control switching of the cascaded optical switch through all ports for the schedule.

15. The fronthaul monitoring method of claim 10, wherein, the test coordinator software module is configured to cause an RF test of a specific RRH and, subsequent to sampling RF frames, the test coordinator software module is configured to cause a start of the fiber monitoring testing.

16. The fronthaul monitoring method of claim 10, wherein the fiber monitoring testing comprises Optical Time Domain Reflectometry (OTDR) testing and the RF testing comprises receiving and monitoring a Common Public Radio Interface (CPRI) link.

17. A non-transitory computer-readable medium comprising instructions executable by a processor that, in response to such execution, cause the processor to perform the steps of:

for monitoring a plurality of links between a base station and multiple Remote Radio Heads (RRH) comprising, analyzing an optical RF signal for RF testing of RF spectrum thereof to identify RF spectrum issues at a Radio Frequency (RF) analysis module;

causing fiber monitoring testing via a fiber monitoring module by injecting light pulses on the one of the plurality of links to identify fiber infrastructure issues;

causing configuration of an optical switch to switch an input port connected to the RF analysis module and the fiber monitoring module between one or more Remote Radio Heads (RRH); and coordinating, via a test coordinator software module, the simultaneous RF testing of a link to one of the one or more RRHs and the fiber monitoring testing of the link, and coordinating testing to the one or more RRHs via the configuring of the optical switch.

18. The non-transitory computer-readable medium of claim 17, wherein the instructions, in response to such execution, cause the processor to perform the steps of:

causing a baseline fiber monitoring test to each RRH to locate all inline switches.

19. The non-transitory computer-readable medium of claim 18, wherein, subsequent to the baseline fiber monitoring test, the test coordinator software module performs coordination by causing RF testing and fiber monitoring testing with each of the multiple RRHs based on a schedule.

20. The non-transitory computer-readable medium of claim 17, wherein, the test coordinator software module is configured to cause an RF test of a specific RRH and, subsequent to sampling RF frames, the test coordinator software module is configured to cause a start of the fiber monitoring testing.

* * * * *